(12) United States Patent
Scott et al.

(10) Patent No.: US 7,038,681 B2
(45) Date of Patent: May 2, 2006

(54) SYSTEM AND METHOD FOR GEOREFERENCING MAPS

(75) Inventors: Dan Martin Scott, Irving, TX (US); Darin Wayne Higgins, Forth Worth, TX (US)

(73) Assignee: SourceProse Corporation, Euless, TX (US)

( * ) Notice: Subject to any disclaimer, the term of this patent is extended or adjusted under 35 U.S.C. 154(b) by 517 days.

(21) Appl. No.: 10/127,648

(22) Filed: Apr. 22, 2002
(Under 37 CFR 1.47)

(65) Prior Publication Data
US 2005/0073532 A1     Apr. 7, 2005

Related U.S. Application Data

(63) Continuation-in-part of application No. 09/537,849, filed on Mar. 29, 2000.

(51) Int. Cl.
*G06T 11/20* (2006.01)
(52) U.S. Cl. ....................................................... 345/440
(58) Field of Classification Search ................ 345/440
See application file for complete search history.

(56) References Cited

U.S. PATENT DOCUMENTS

| | | | |
|---|---|---|---|
| 4,254,467 A | 3/1981 | Davis et al. | |
| 4,458,330 A | 7/1984 | Imsand et al. | |
| 4,737,916 A | 4/1988 | Ogawa et al. | ............... 364/443 |
| 4,852,183 A | 7/1989 | Abe et al. | |
| 4,876,651 A | 10/1989 | Dawson et al. | |
| 4,885,706 A | 12/1989 | Pate et al. | ............. 364/551.01 |
| 4,899,136 A | 2/1990 | Beard et al. | ................. 340/706 |
| 5,018,210 A | 5/1991 | Merryman et al. | |
| 5,050,222 A | 9/1991 | Lee | |
| 5,113,517 A | 5/1992 | Beard et al. | ................. 364/200 |
| 5,233,335 A | 8/1993 | Berwin | |
| 5,247,356 A | 9/1993 | Ciampa | ...................... 358/109 |
| 5,274,752 A | 12/1993 | Kawazome | |
| 5,323,317 A | 6/1994 | Hampton et al. | |

(Continued)

FOREIGN PATENT DOCUMENTS

EP         0 619 554 A2     10/1994

(Continued)

OTHER PUBLICATIONS

Critical zones in desert fog: aids to multiscale navigation Susanne Jul, George W. Furnas , Nov. 1998.*

(Continued)

*Primary Examiner*—Jeffery Brier
*Assistant Examiner*—J. Amini
(74) *Attorney, Agent, or Firm*—Finnegan, Henderson, Farabow, Garrett, & Dunner, L.L.P.

(57) ABSTRACT

After FEMA paper flood maps are scanned into a computer system, they are each displayed side-by-side with the relevant portion of a stored vector map covering the geographic area covered by all of the FEMA maps. During display, corresponding points, or "point-pairs," on each map are marked by a keyboard or mouse device. The corresponding points may be such artifacts as roads, stream beds, railroad tracks, intersections of the foregoing, buildings, mountain peaks, etc., which are identifiable on each displayed map. When two point-pairs are marked, a stored algorithm calculates georeferencing functions which permit translation of the x,y coordinates of the raster map to the latitude,longitude coordinates of the vector map and vice versa. As more point-pairs are marked, the georeferencing functions are refined. Another algorithm removes apparent "bad" points from the georeferencing calculations, which points may re later used if it appears that they are not bad.

44 Claims, 5 Drawing Sheets

U.S. PATENT DOCUMENTS

| | | | |
|---|---|---|---|
| 5,381,338 A | 1/1995 | Wysocki et al. | |
| 5,396,582 A | 3/1995 | Kahkoska | |
| 5,406,342 A | 4/1995 | Jongsma | |
| 5,414,462 A | 5/1995 | Veatch | |
| 5,418,906 A | 5/1995 | Berger et al. | |
| 5,422,989 A | 6/1995 | Bell et al. | 395/133 |
| 5,428,546 A | 6/1995 | Shah et al. | 364/449 |
| 5,467,271 A | 11/1995 | Abel et al. | |
| 5,487,139 A | 1/1996 | Saylor et al. | 395/135 |
| 5,592,375 A | 1/1997 | Salmon et al. | |
| 5,594,650 A | 1/1997 | Shah et al. | |
| 5,596,494 A | 1/1997 | Kuo | 364/420 |
| 5,608,858 A | 3/1997 | Kurosu et al. | |
| 5,623,679 A | 4/1997 | Rivette et al. | |
| 5,623,681 A | 4/1997 | Rivette et al. | |
| 5,631,970 A | 5/1997 | Hsu | |
| 5,640,468 A | 6/1997 | Hsu | |
| 5,659,318 A | 8/1997 | Madsen et al. | |
| 5,682,525 A | 10/1997 | Bouve et al. | |
| 5,699,244 A | 12/1997 | Clark, Jr. et al. | 364/420 |
| 5,699,255 A | 12/1997 | Ellis et al. | |
| 5,715,331 A | 2/1998 | Hollinger | |
| 5,719,949 A | 2/1998 | Koeln et al. | |
| 5,734,756 A | 3/1998 | Sherman et al. | |
| 5,748,777 A | 5/1998 | Katayama et al. | |
| 5,748,778 A | 5/1998 | Onoguchi | |
| 5,757,359 A | 5/1998 | Morimoto et al. | 345/156 |
| 5,771,169 A | 6/1998 | Wendte | |
| 5,815,118 A | 9/1998 | Schipper | 342/451 |
| 5,842,148 A | 11/1998 | Prendergast et al. | |
| 5,848,373 A * | 12/1998 | DeLorme et al. | 701/200 |
| 5,857,199 A * | 1/1999 | Tamano et al. | 707/104.1 |
| 5,884,216 A | 3/1999 | Shah et al. | 701/207 |
| 5,892,909 A | 4/1999 | Grasso et al. | |
| 5,902,347 A | 5/1999 | Backman et al. | 701/200 |
| 5,904,727 A | 5/1999 | Prabhakaran | 701/208 |
| 5,907,630 A | 5/1999 | Naoi et al. | |
| 5,929,842 A | 7/1999 | Vertregt et al. | |
| 5,929,865 A | 7/1999 | Balz et al. | |
| 5,930,474 A | 7/1999 | Dunworth et al. | |
| 5,937,014 A | 8/1999 | Pelin et al. | |
| 5,961,572 A | 10/1999 | Craport et al. | |
| 5,966,135 A | 10/1999 | Roy et al. | |
| 5,966,469 A | 10/1999 | Moon et al. | |
| 5,969,723 A | 10/1999 | Schmidt | |
| 5,969,728 A | 10/1999 | Dye et al. | |
| 5,974,423 A | 10/1999 | Margolin | |
| 5,978,804 A | 11/1999 | Dietzman | |
| 5,986,697 A | 11/1999 | Cahill, III | |
| 5,987,136 A | 11/1999 | Schipper et al. | |
| 5,987,173 A | 11/1999 | Kohno et al. | |
| 5,987,380 A | 11/1999 | Backman et al. | |
| 5,991,780 A | 11/1999 | Rivette et al. | |
| 5,995,023 A | 11/1999 | Kreft | |
| 5,999,878 A | 12/1999 | Hanson et al. | |
| 6,005,509 A | 12/1999 | Buckreuss | |
| 6,006,161 A | 12/1999 | Katou | 701/212 |
| 6,008,756 A | 12/1999 | Boerhave et al. | |
| 6,032,157 A | 2/2000 | Tamano et al. | 707/104 |
| 6,044,324 A | 3/2000 | Boerhave et al. | |
| 6,061,618 A | 5/2000 | Hale et al. | |
| 6,084,989 A | 7/2000 | Eppler | 382/293 |
| 6,119,069 A | 9/2000 | McCauley | |
| 6,144,920 A | 11/2000 | Mikame | 701/212 |
| 6,148,260 A | 11/2000 | Musk et al. | |
| 6,161,105 A | 12/2000 | Keighan et al. | |
| 6,236,907 B1 | 5/2001 | Hauwiller et al. | |
| 6,249,742 B1 | 6/2001 | Friederich et al. | |
| 6,307,573 B1 | 10/2001 | Barros | |
| 6,321,158 B1 | 11/2001 | DeLorme et al. | 701/201 |
| 6,339,745 B1 | 1/2002 | Novik | |
| 6,377,210 B1 | 4/2002 | Moore | |
| 6,377,278 B1 | 4/2002 | Curtright et al. | 345/634 |
| 6,462,676 B1 | 10/2002 | Koizumi | 340/995 |
| 6,487,305 B1 | 11/2002 | Kambe et al. | 382/113 |
| 6,489,920 B1 | 12/2002 | Anders et al. | |
| 6,504,571 B1 | 1/2003 | Narayanaswami et al. | 348/231.99 |
| 6,505,146 B1 | 1/2003 | Blackmer | |
| 6,538,674 B1 | 3/2003 | Shibata et al. | |
| 6,549,828 B1 | 4/2003 | Garrot et al. | |
| 6,565,610 B1 | 5/2003 | Wang et al. | |
| 6,577,714 B1 | 6/2003 | Darcie et al. | |
| 6,606,542 B1 | 8/2003 | Hauwiller et al. | |
| 6,631,326 B1 | 10/2003 | Howard et al. | 702/5 |
| 6,650,998 B1 | 11/2003 | Rutledge et al. | |
| 6,678,615 B1 | 1/2004 | Howard et al. | 702/5 |
| 6,785,619 B1 | 8/2004 | Homann et al. | |
| 2001/0026270 A1 | 10/2001 | Higgins et al. | |
| 2001/0026271 A1 | 10/2001 | Higgins et al. | |
| 2001/0028348 A1 | 10/2001 | Higgins et al. | |
| 2001/0033290 A1 | 10/2001 | Scott et al. | |
| 2001/0033291 A1 | 10/2001 | Scott et al. | |
| 2001/0033292 A1 | 10/2001 | Scott et al. | |
| 2001/0052896 A1 | 12/2001 | Yun | |
| 2002/0035432 A1 | 3/2002 | Kubica et al. | |
| 2002/0143469 A1 | 10/2002 | Alexander et al. | |
| 2002/0145617 A1 | 10/2002 | Kennard et al. | |
| 2002/0147613 A1 | 10/2002 | Kennard et al. | |

FOREIGN PATENT DOCUMENTS

| | | |
|---|---|---|
| JP | 11296540 A | 10/1999 |
| WO | WO 90/14627 | 11/1990 |
| WO | 0 454 129 A2 | 10/1991 |
| WO | WO 97/49027 | 12/1997 |

OTHER PUBLICATIONS

Exploring 3D navigation: combining speed-coupled flying with orbiting Desney S. Tan, George G. Robertson, Mary Czerwinski Mar. 2001.*

The NASA Digital Earth Testbed Jeff de La Beujardière, Horace Mitchell, Robert Raskin, Ananth Rao , Nov. 2000.*

Noah Radford, "The Use of GIS in Flood Hazard Analysis: A Report for the City of Warwick and Project Impact," Jun. 1999.

"R2V: Advanced Raster to Vector Conversion Software for Automated Map Digitizing," Able Software Corp., Sep. 20, 1999, pp. 1-4.

Li et al., "Accuracy Assessment of Mapping Products Produced from the Star-3i Airborne IFSAR System".

Fukunaga et al., "Image Registration Using an Image Graph and its Application to Map Matching," IEE Proceedings-E, vol. 138, No. 2, Mar. 1991.

Wang, "Integrating GIS's and Remote Sensing Image Analysis Systems by Unifying Knowledge Representation Schemes," IEEE Transactions on Geoscience and Remote Sensing, vol. 29, No. 4, p. 656-664, Jul. 1991.

Roux, "Automatic Registration of Spot Images and Digitized Maps," IEEE, p. 625-628, 1996.

Reddy et al., "Under the Hood of GeoVRML 1.0," Proceedings of the Fifth Symposium on Virtual Reality Modeling Language (Web3D-VRML), Feb. 2000.

Burton et al, "Using High Performance GIS Software to Visualize Data: a Hands-On Software Demonstration," Proceedings of the 1998 ACM/IEEE Conference on Supercomputing (CDROM), Nov. 1998.

G. Wiederhold, "The Role of Government in Standards," StandardView, Dec. 1993, vol. 1 Issue 2.

P. Wilson, "The Application of Computer Graphics to Environmental Planning," Proceedings of the ACM 1980 Annual Conference, Jan. 1980.

CDS Mapping Systems, et al., "CDS Business Mapping," Feb. 2, 1999. http://web.archive.org/web/19990202115053/www/cdsys.com/index.html.

GeoPlace.com et al., "Mapping Awareness," 1999 http://web.archive.org/web/20000301085059/www/geoplace.com/archives.asp.

* cited by examiner

SYSTEM AND METHOD FOR GEOREFERENCING MAPS

CROSS REFERENCE TO RELATED APPLICATIONS

This application is a continuation-in-part ("CIP") of U.S. patent application Ser. No. 09/537,849, filed Mar. 29, 2000, the contents of which are expressly incorporated by reference in its entirety.

FIELD OF THE INVENTION

The present invention generally relates to geographic map processing and, in particular, to a system and method for georeferencing originally un-georeferenced paper maps, that is, for assigning latitude and longitude references to paper maps originally lacking them (or any other geographic referencing). More particularly, the present invention relates to scanning un-georeferenced paper maps to produce un-georeferenced digital raster maps, and then associating the digital raster maps with a geographic coordinate system. The present invention can be advantageously used to georeference flood maps published by FEMA.

BACKGROUND OF THE INVENTION

FEMA Flood Maps

The Federal Emergency Management Agency (FEMA) publishes a large set of "flood maps." These paper maps are the official, Federally sanctioned source for determining flood risk. The flood maps delineate regions that are assigned a flood zone designation from among a limited set of possible designations.

For example, a region designated "Zone A" on a flood map is a high risk area, which FEMA believes has at least a 1 in 30 chance of flooding during any given year. A region designated "Zone V" combines the properties of a "Zone A" with the additional risk of wave action or flowing water. In the foregoing context, performing a "flood zone determination" (also known as a "flood hazard determination" or a "flood certification") relative to a location entails a two-step process: (1) determining, based on FEMA flood maps and other materials, the FEMA-designated flood zone for the location in question, and, then, (2) completing required paperwork to report this determination (along with certain other required information) to interested parties, such as home buyers, their lenders, and real estate brokers.

FEMA flood maps come in a variety of styles, but broadly speaking they can be divided into two types of maps, namely, index panels ("IP"), or index panel maps, FIG. 5, and regular panels ("RP"), or regular panel maps, FIGS. 1–4.

Referring to FIG. 1, a regular panel map 10 shows a relatively small geographic area at a fairly high level of detail. Each regular panel 10 depicts various "features" of the relevant area. these features include (without limitation) streets 12,13 railroad tracks 14, streambeds 16, lakes, intersections 18,20 of the foregoing, and detailed delineations of the community borders and the boundaries of various extant flood zones (not shown in FIG. 1, but see FIG. 2) and their classifications.

FIG. 2 depicts a regular panel map 10 in which flood zones 22 are depicted. As is typical, the flood zones 22 are denoted or "flagged" as variously shaded regions contained within irregular curvilinear boundaries (the "flood zone boundary"). Labels 30 on regular panels 10 designate the types of flood zones that have been shaded. With the exception of regular panels 10 described as "not printed" ("PNP") and panels 10 presenting flood zone-designated communities, described in greater detail below, all flood zone determinations are made by reference to appropriate regular panel maps 10.

Referring to FIGS. 1 and 2, each regular panel map 10 is bounded by a "neatline," that is, a rectangular frame or border 32 surrounding the geographic area of interest. The geographic area of interest may not completely "fill" the neatline 32, as indicated at 34 in FIG. 1. For example, the actual geographic area contained within the neatline 32 of a regular panel 10 might consist of (a) a portion 33 of a community and the designated flood classification of the portion and (b) unincorporated or other portions 34 which surround, are surrounded by, or abut the community, and which have no flood classification depicted on the panel 10.

Referring to FIG. 3, if FEMA has designated a regular panel map 10 as being applicable to determining the flood zone classification of only an incorporated community, designated at 42 in FIG. 3, then the regular panel 10 cannot be used to determine the flood classification of any depicted unincorporated areas, designated at 34,36,38. According to FEMA protocol, the foregoing obtains whether or not flood zones for the unincorporated area are shown on the regular panel 10. Indeed, a FEMA panel map 10 often does not show flood zones for areas outside of the designated region for the map 10 (the designated region 42 is a portion of the community in this example). Sometimes the area outside of the designated area is just shown as a blank area on the panel, as at 34,36,38. Regardless of how much or how little detail is shown, by convention, a flood determination can be made using a panel only in the region designated by FEMA.

The "inset" 44 of a panel 10 means any geographic region that is both shown on the panel and as to which FEMA mandates the flood zone designations set forth on the panel to be applied. A panel inset 10 may be self-connected (connected with all parts of itself) as in FIGS. 1–3, or, as shown in FIG. 4, it may be split into two or more self-connected regions 46,48 by intervening non-designated areas 50 on the panel 10 and may include other non-designated areas, such as those shown at 52 and 54. The "insets" of a panel map 10 may comprise a collection of disjoint, self-connected regions 46,48 which collectively contain all of the designated area of the panel 10, and themselves constitute a subset of the geographic region contained within the neatlines 32.

Thus, from the foregoing, an actual map panel 10 consists, in general, of three parts: (1) the inset(s), (2) other (non-designated) geographic regions within the neatlines 32, but not included within the inset(s), and (3) areas of the panel which are outside of the neatlines 32, and generally show various types of textual information such as a map legend, the map panel number, and panel effective date, etc. It is true that, in the ideal case, the insets 46 and 48 should include only designated regions of the panel 10, but as a practical matter it is sometimes convenient for FEMA to include some non-designated areas within the insets, so as to simplify the process of gathering inset border data.

Referring to FIG. 5, an index panel map 60 shows a considerably broader area than a regular panel 10, but at a lesser degree of detail, and usually without the flood zones being indicated thereon. Typically, an index panel 60 shows a broad geographic view of the locations of the various regular panels 10 that make up an entire community, or large portion thereof. It should be noted that, while FEMA "defines" communities, these FEMA-defined communities often do not necessarily correspond to one's intuitive sense of what a community is.

The index panel 60, generally depicted in FIG. 5, provides its broader, less detailed overview by displaying the neatline boundaries 32 of each of its regular panels 10 against a background of major geographic features (e.g. highways, lakes, etc.). Each of the regular panels' 10 neatline boundaries 32 is labeled with the corresponding number of its regular map panel, as represented by "XX," "YY" and "ZZ" in FIG. 4. Index maps 60, in effect, show how to "put together" the panel map 10 "jigsaw", that is, how to associate panel maps 10 with each other to form a grid thereof, grid lines 62 thereof being comprised of the aligned and/or overlapping neatlines 32 of adjacent panels 10.

Until the advent of the present invention, the primary purpose of the index maps 60 has been their use as an aid in manually determining which of the regular maps 10 should be consulted in order to make a flood zone determination. For example, if a property is known to be located in Community A, then a map analyst might first locate the property on the Community A index map 60. The analyst could immediately determine—by examining the neatline borders 32,62 and the labels "XX," "YY," "ZZ" displayed on the index map 60—which regular panel map 10 to consult. Since there are hundreds of panel maps 10 in the index map 60 of various communities, identification of a particular panel map 10 by examining an index map 60 can be effected more quickly than serially examining large numbers of panel maps 10. The present invention provides other, much more efficient ways of determining the correct regular panel map 10 applicable to a particular location.

Index maps 60 also contain neatline borders 32 for panel maps 10 that are not printed as such, and which are designated "panel not printed" or "PNP." As this name suggests, no actual panel map 10 is ever printed for a PNP. Instead, the relevant index map 60 displays the flood zone classification for the region contained within the PNP neatline borders 32. Accordingly, In the case of a PNP, the flood zone classification is determined from the index map 60, rather than from a regular panel 10.

In addition to the foregoing techniques, flood zone determinations can also be made on the basis of FEMA's denoting certain communities as "flood zone designated communities." In this event, FEMA mandates that a denoted community have the same flood zone classification throughout. As a consequence FEMA does not publish any flood panels—either regular 10 or index 60—for the community. Property located anywhere in that community assumes the flood zone classification of the community.

Digital Raster Maps

A digital raster map image, FIG. 2, may be thought of as a number of points selectively present on—or missing from—each X,Y coordinate of a Cartesian display. Points that are present are 0usually called "pixels." Besides having an address at an X,Y location, a pixel may have a "value," usually a numeric quantity designating a specified color or grey-scale value for the pixel. In this latter event, a "missing pixel" may be represented by a pixel having a value pursuant to which it is colored white. The X,Y location and value of each pixel is data that may be stored. A digital raster map may be created by optically, digitally scanning a conventional paper map and thereafter using a computer system to define and/or display it in terms of its pixel locations and color values. Commonly used formats for storing scanned images currently include TIFF, JPEG, and PNG. Any FEMA regular panel 10 or index panel 60 may be represented as a digital raster map.

Digital Vector Maps

A vector map, FIG. 6, may be viewed as a "virtual" map that comprises, in effect, a collection of stored data. The stored data define the locations of plural nodes and plural straight line segments interconnecting the nodes. The stored data defining a vector map represents geographic information in the form of collections of points—the nodes—and line segments interconnecting the nodes to form polygons, i.e., closed figures comprised of line-interconnected nodes. These points, lines, and polygons may have additional information associated with them. For example, the stored data may indicatre that a particular point or node is the location of the capitol building, or that a selected polygon describes the border of Lake Placid. The polygons are surrogates for, or representations of, the actual curvilinear configuration of various geographic features: streets, streams, lakes, cities, counties, etc. Typically, the features—nodes alone or two or more interconnected nodes—are presented in terms of latitude/longitude (or lat/lon) values. If this or another earth-referenced system is used to locate the nodes of the map, the map is said to be georeferenced. A visually sensible map may be "drawn" from the stored data.

In view of the fact that georeferencing of digital raster map images plays a key role in the present invention, the precise meaning of this term, for the purposes hereofand as used herein, is set forth below.

Georeferencing

A raster map image is said to be "georeferenced" if there exist mathematical functions, f and g, such that one function can be used to convert the X,Y coordinates of the pixels describing the map image to corresponding latitude/longitude coordinates and the other function can be used to convert the latitude/longitude coordinates of the pixels of the image to their corresponding X,Y coordinates. In other words, f and g effect the following:

1. If (x, y) represents a pixel location on a digital raster map image, then f(x, y)=(Lon, Lat) represents the longitude and latitude of the corresponding physical location; and
2. If (Lon, Lat) represents a physical location that lies within the region covered by the map, then g(Lon, Lat)=(x, y) represents the point on the digital raster map image that corresponds to that longitude and latitude.

In the previous paragraph, (x,y) defines a point pursuant to the natural internal coordinate system of the raster map image. Most digital vector map images use longitude and latitude as their internal coordinate system. Accordingly, most digital vetor maps can be considered to be trivially georeferenced per se. Most digital raster map images use the pixels of its image as a kind of natural coordinate matrix. Such a raster map image is not inherently trivially georeferenced and requires the operation of a non-trivial georeferencing function to convert back and forth between coordinate systems.

Most FEMA maps do not contain any latitude/longitude information that would be useful in georeferencing their scanned raster image. Some recently FEMA-issued panels do show latitude/longitude values at certain points thereon, but such panels are in a distinct minority when considered in the context of the 100,000+ panels that FEMA currently provides.

SUMMARY OF THE INVENTION

Pursuant to the present invention there is provided a system and method for georeferencing a digital raster map by associating specific points on the raster map with corresponding points on a georeferenced vector map or another georeferenced raster map. According to the preferred embodiment, a raster map and a corresponding vector map are simultaneously displayed to a user. The user then locates a common geographic point or feature on each map, and marks each of them as a unique point-pair. When the user has marked at least two point-pairs, the system then computes a georeferencing function, based on the pixel-coordinates of the points marked on the raster map and the corresponding geographic coordinates of the points on the vector map. Thereafter the geographic coordinates of any point on the map may be computed. As more point-pairs are identified, the georeferencing function is modified for increased accuracy.

A digital raster map is a computerized map image that resembles a conventional paper map in that it presents an image of a mapped area, but is not associated with any additional underlying data associated with the features of the map. A digital raster map is typically created by scanning a conventional paper map, and is a grid-based map composed of pixels (or points) of color, shades of grey or black and white. Each pixel in the grid has can be referenced by X,Y pixel coordinates, and has only a value, which indicates the color of that pixel. The pixels of a raster map are not, without more, georeferenced, i.e., the pixels of a raster map cannot be identified by latitude/longitude or other earth reference. Raster images are commonly referred to as "bit mapped."

A vector map comprises stored data defining nodes, lines and polygons, rather than pixels, to describe an image. Unlike a raster map, in which the map image is simply stored as a grid of pixels, when a vector map is displayed, it is "drawn" from a set of underlying data. A vector map is created through the placements of nodes on a plane and connecting those nodes with lines to form closed polygons. Vector lines can be attributed with tables of data such as elevations, values, names or other information relative to the line. Vector data can be displayed in three dimensions if the lines are attributed with Z values, modified or changed relative to user need, or layered to allow for turning off and on the viewing of different information.

Because of their feature attribution properties, vector maps are particularly useful for displaying geographic data. Vector maps are used to display boundaries or lines that denote the position and extent of features, such as county boundaries or lines denoting stream and river systems. It is also very easy to view or manipulate the data underlying a vector map, for example to view or change the elevation of a feature.

Also because vector maps are commonly drawn from a geographic data set describing the area shown, they are typically georeferenced. Georeferencing is the process of relating source coordinates, such as X,Y Cartesian coordinates, to geographic coordinates, typically in standard latitude/longitude. An image or a vector file is georeferenced to be used within a mapping/geographic environment. In a vector map, the data from which the map is drawn typically includes a geographic coordinate set.

Modern GIS systems normally make use of digital vector map information. However, a vast legacy of paper-based map information exists. It is very expensive and time consuming to convert all of the information on these paper maps over to a digital vector format. In many cases the scope and expense of such conversions render them completely impractical. However, even when a complete conversion to digital vector-based format is not possible, it is still possible to obtain some of the benefits of computerized map systems in acordance with the present invention pursuant to which paper maps are converted to digital raster maps (by scanning them) and the raster image is thereafter georeferenced. After georeferencing, there is, according to the present invention, a definite mathematical relationship between the pixel coordinates in the raster map, and the geographic coordinates of the feature represented by that pixel. The present invention contemplates a system and method for georeferencing a raster map by associating points thereon with corresponding points on a previously georeferenced vector map. The invention is described as applicable to georeferencing FEMA flood maps, but may be used to georeference any non-georeferenced paper or other map.

First, using known scanning hardware and software, FEMA or other paper map images are scanned to create digital raster images thereof. The data representing the X,Y coordinates of the pixels comprising the raster images are stored in any convenient storage facility, such as computer memory or a CDRom. The stored raster images may be referred to herein as "flood map images."

Second, polygons that approximate the neatline borders of each panel map and polygons that approximate the inset boundaries of the flood map images within each panel map neatline are "captured." Both types of polygons (and other desired polygons, e.g., those representing notable features on the paper map) are captured, by activating a device such as a mouse.

The capture of any of the foregoing polygons shown on the raster image, FIG. 2, of a scanned paper map is achieved in the following manner. The user identifies the vertices (points) of the polygon by "clicking" a mouse icon, in order, on a suitable sequence of points on a displayed flood map image or raster image. The sequence of points may be "smooth" or may be angular, but, in any event, represents an approximation of the actual polygon. In the case of the neatlines, because such are rectangles, the polygon representation thereof and the actual neatline will be similar, if not the same. Because inset boundaries are often complexly curvilinear, a captured polygon representing an inset is likely to be less "smooth" than the actual polygon. Of course, smoothness may be increased by increasing the number of points or vertices captures in drawing the polygon. The order in which the user clicks on the vertices determines the order of traversal of the vertices of the polygon. As the user identifies a first and then subsequent vertices, a line segment is drawn from the previous vertex to the next identified vertex, until the polygon is completed upon subsequently clicking on the first vertex. The completed polygon is preferably displayed as overlying the displayed flood map image and may be edited, e.g., by adding additional vertices thereto to more accurately mimic the shape of the extant polygon.

Elementary tests for the correctness of the polygons thus defined and captured are preferably performed. These tests include at least a test to see that no edges of a polygon cross. Additional tests may include a test to see that no polygon edge is shorter than some edge length parameter, and a test to ensure that the edges defined do form a closed polygon. These tests are applied on an ongoing basis, as the user determines additional vertices of the polygon. Errors may be highlighted in different colors or brought to the attention of the user through pop-up panels on the computer system. The user is allowed to edit the polygons to correct errors, or to improve their quality. Each polygon definition is stored, and once the map to which it relates is georeferenced, the polygons—that is, their vertices and lines—will also be georeferenced.

Next, the flood map (digital raster) images are georeferenced. Initially, there is obtained or generated a digital vector map covering the same general geographic area covered by the flood map images and capable of displaying and depicting the same geographic features, such as streets, rivers, railroads, etc. The digital vector map may be a commercially obtainable map covering a limited area or an entire geographic entity; vector maps covering the entire United States are available.

Then, the vector map image and the flood map image are simultaneously displayed. Such may result in the maps being displayed side-by-side, over-and-under, or in superimposition. Using location information from the flood map image (e.g. county name, state, community name, large metropolitan area, etc.), the user manipulates the vector map (by zooming, panning, scrolling etc.) until it displays roughly the same region displayed in the flood map image.

The user then identifies a first point-pair, that is, a pair of points—one point on the vector map, the other point on a selected (if more than one) inset of the flood image map—that represent the same geographic location. Such point-pairs may be identified by "clicking" a mouse icon on an identifiable point on the flood map image—say, a street intersection—and then "clicking" on the same point or street intersection shown on the vector map. Accurate placement of the two points can be assured by zooming in on the images. Additional point-pairs (one point from the vector map, and one from the flood map image) are then identified.

As the second and subsequent point-pairs are each identified, an algorithm calculates and provides a georeferencing function correlating the flood map image and the raster image. Specifically, upon identification of two point-pairs, a georeferencing function is generated and becomes available for the flood map image. This georeferencing function is refined as additional point-pairs are identified. As soon as a georeferencing function is available it is used to "synchronize" the vector map with the digital flood map image. The synchronized maps display the same geographic region, and if one image is scrolled, panned, or zoomed by the user, the same manipulation occurs automatically in the other map image. The afore-noted "synchronization" greatly facilitates the placement of additional point-pairs, which improves the quality of the current georeferencing function. and is more specifically described in commonly assigned U.S. patent application Ser. No. 537,161.

If multiple inset polygons have been defined on a single flood map image, and if those insets are not shown in their natural correct geographic relationship to one another, then it is necessary to calculate a different georeferencing function for each of the inset polygons. This situation occurs when FEMA shows a geographic region on one 0 map panel, which does not actually belong in the same geographic area as the rest of the map panel contents. FEMA sometimes does this in order to eliminate the necessity of printing another map with only a tiny region shown on it. In contemplation of this event, this step of the present invention is more generally stated as follows: When georeferencing an inset, the user must select only point-pairs contained within that inset; a georeferencing function is calculated for each inset, and must be stored so that this correspondence is clear.

Using the foregoing approach, all FEMA flood map insets are georeferenced and stored. The georeferencing of the FEMA maps also georeferences the previously captured polygons representing the neatlines of the panel maps and the insets therewithin. Accordingly, for every inset on a flood map, there exists a function which allows conversion of its X,Y pixel coordinates into lat/lon geographic coordinates. Among other things, such georeferencing implies that the boundaries of an inset itself—that is the stored polygon mimicking the inset boundaries—can be expressed in terms of lat/lon coordinates. More generally, any identifiable points or regions of a flood map image, including the borders of flood zone regions therein, can be expressed in lat/lon coordinates.

If an index map is initially georeferenced, as set forth above, then a preliminary georeferencing of a specific regular panel, the neatline of which is shown on the index map, can be obtained by creating point-pairs out of the corresponding four corners of the neatline boundary which is, of course, shown on both the index map and the regular panel map. In other words, it is not really required for the georeferencing process that one of the maps be a vector map (although this is usually most convenient and practical). It is possible for both maps to be scanned raster map images, as long as the same geographic region is depicted on each map and one map is already georeferenced.

BRIEF DESCRIPTION OF THE DRAWINGS

The novel features of the invention are set forth in the appended claims. The invention itself however, as well as its mode of use, further objects and advantages thereof, will best be understood by reference to the following detailed description read in conjunction with the accompanying drawings, wherein:

DETAILED DESCRIPTION OF THE INVENTION

Figure 6:
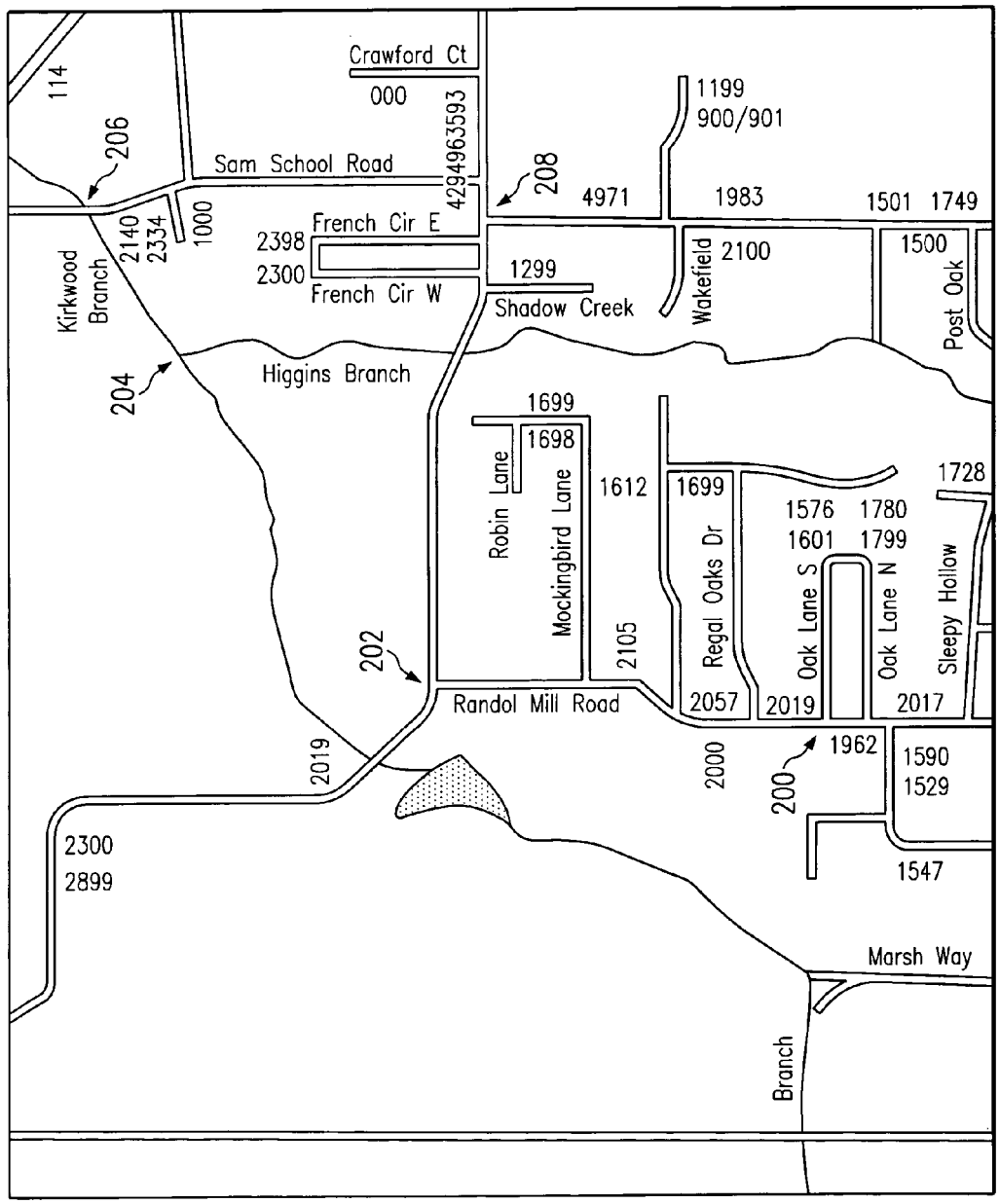
FIG. 6 is a general representation of a vector map which corresponds to the raster map of FIG. 2, in accordance with a preferred embodiment of the present invention.

The present invention is a system and method for georeferencing digital raster maps, FIGS. 1–5, by associating specific points on a raster map with corresponding points on a georeferenced vector map, FIG. 6, or another georeferenced raster map.

Figure 1:
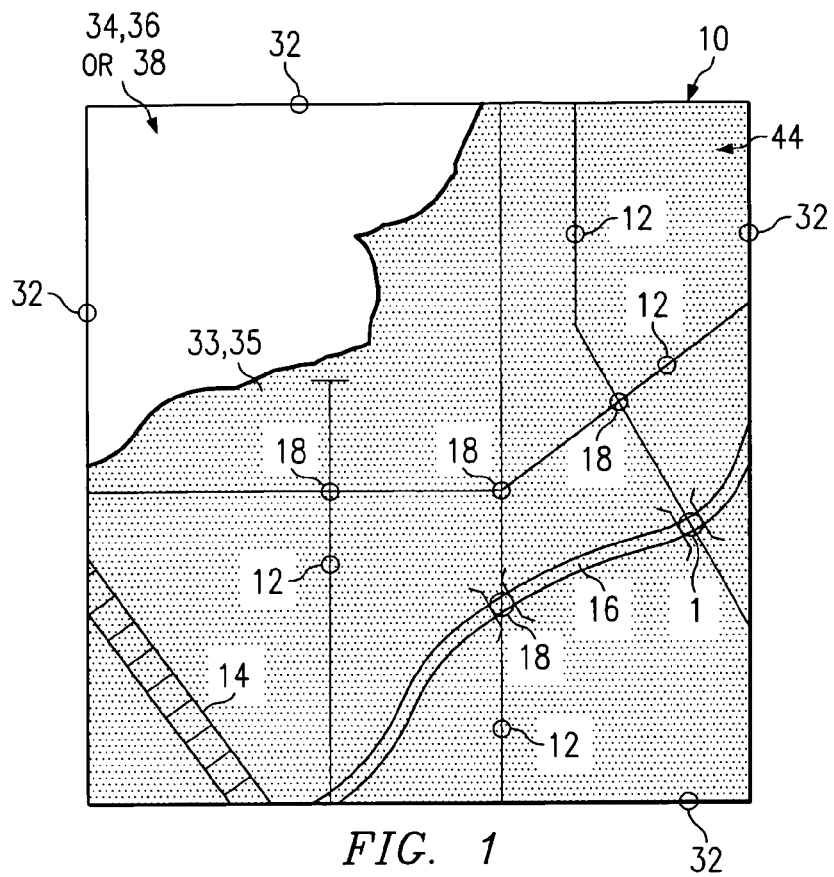
FIGS. 1–4 are general representations of four FEMA panel maps, the insets of three of which do not fill the neatlines thereof and the inset of one of which does fill its neatlines.
Figure 3:
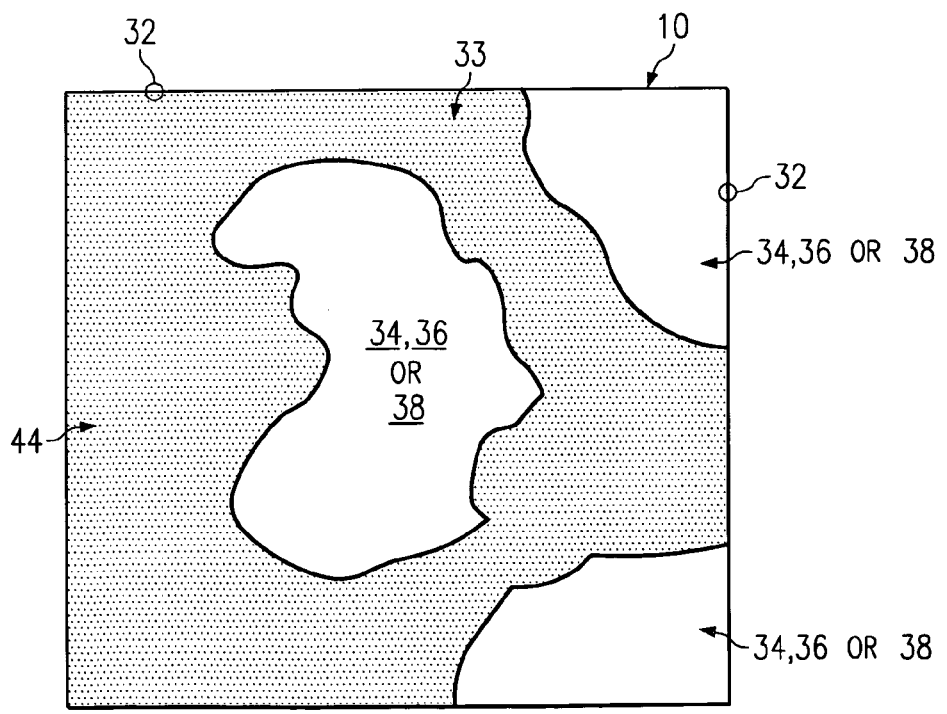
Figure 2:
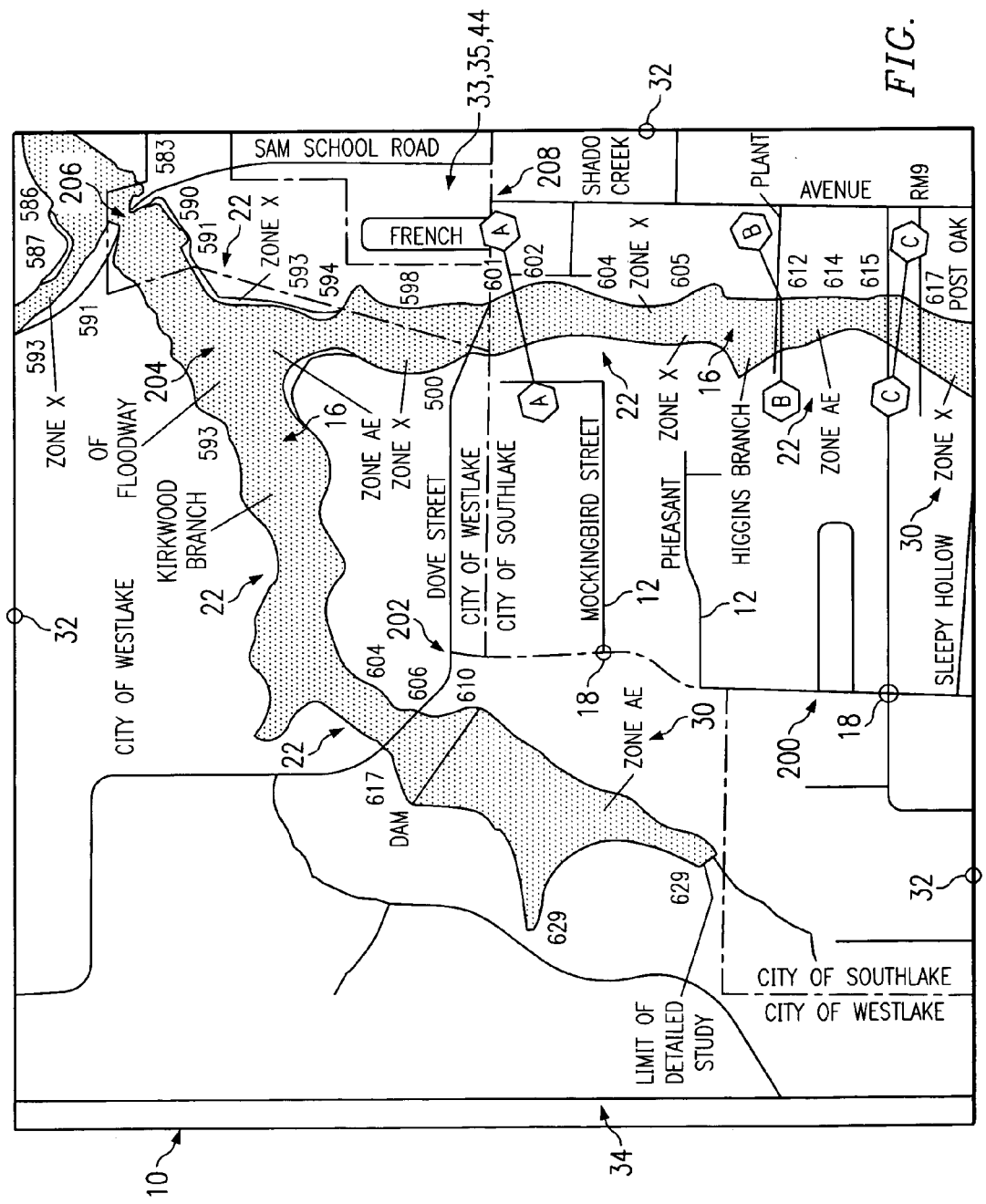
Figure 4:
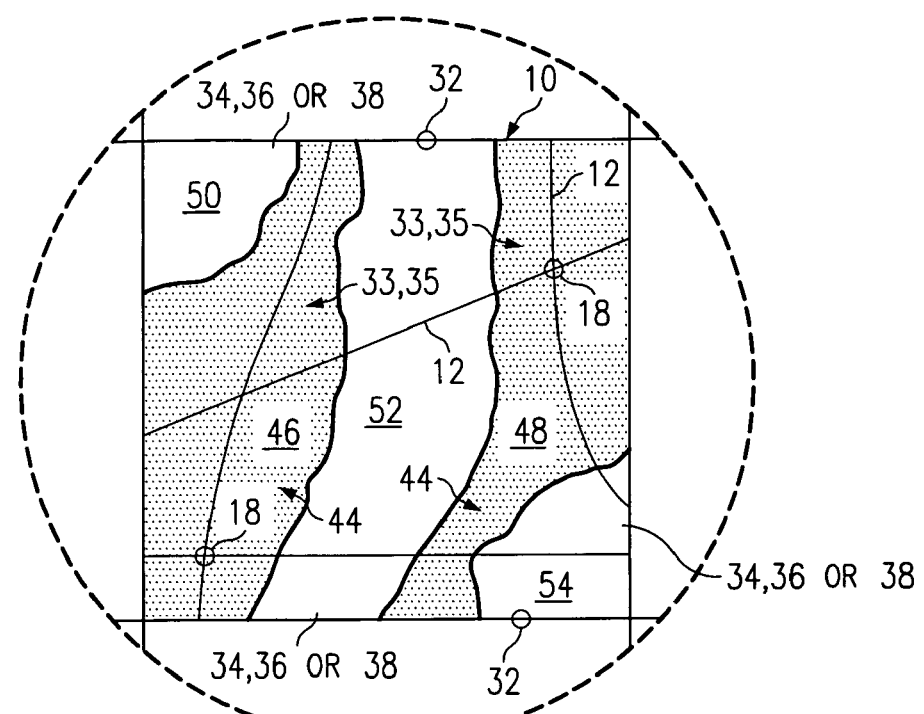
Figure 5:
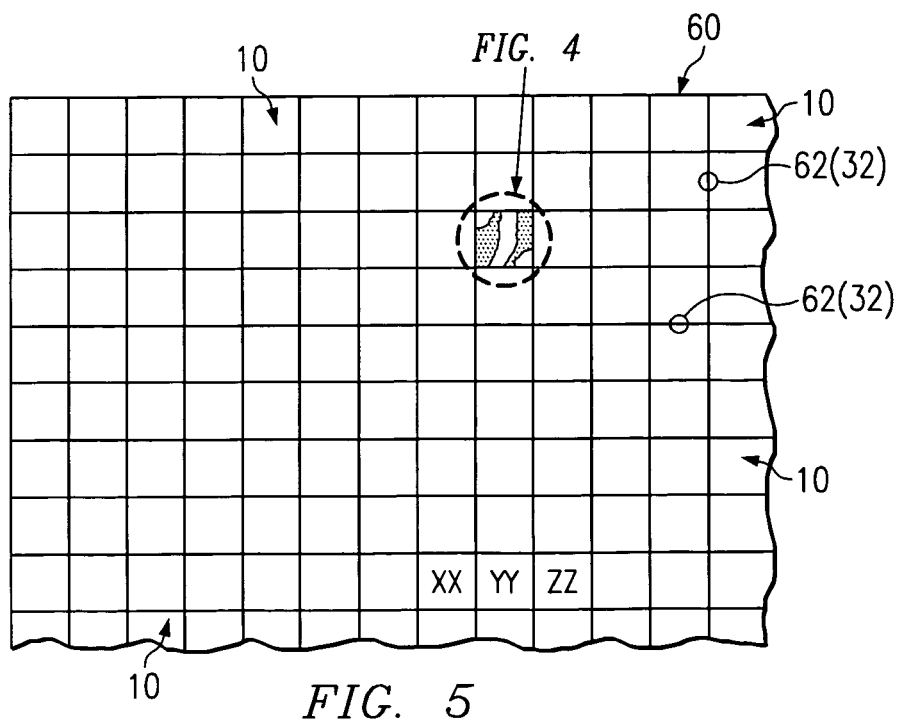
FIG. 5 is a general representation of a FEMA index map made up of a number of the panel maps of FIGS. 1–4.

Before georeferencing is initiated, the neatlines 32 of each raster map, such as FIG. 2, are captured as polygons, and the polygons are then stored. Moreover, polygons mimicking the border of the inset(s), e.g., 33, 46, 48 in FIGS. 1, 3 and 4, are also captured and stored. The vertices and interconnecting lines of the polygons, and preliminary testing methods therefor are discussed above.

Next, a raster map, such as that shown in FIG. 2, and a corresponding vector map, FIG. 6, are simultaneously displayed to a user. The user then locates a common geographic point or feature on each map, FIGS. 2 and 6. Some corresponding points are numbered 200, 202, 204, 206 and 208 on both maps of FIGS. 2 and 6. Each set of common points

200—200, 202—202, 204—204, 206—206, and 208—208 is "marked" by the user as a unique point-pair. Marking may be achieved in any convenient way, including "clicking" a mouse on each point of a point-pair so that the x,y coordinates of the point on the raster map of FIG. 2 and the latitude/longitude coordinates of the point on the vector map of FIG. 6 are captured and recorded.

When the user has marked at least two point-pairs, the system computes a georeferencing function, based on the x,y pixel coordinates of the points marked on the raster map of FIG. 2 and the corresponding geographic coordinates of the points on the vector map of FIG. 6. Thereafter the geographic coordinates of any point on the raster map of FIG. 2 map may be easily computed. As more point-pairs are identified, the georeferencing function is modified for increased accuracy.

A digital map image is considered georeferenced if a pair of mathematical functions, f and g have been defined that can be used to convert back and forth between the coordinates of the raster map image of FIG. 2 (as defined by the pixels 0 of the image) and the corresponding longitude and latitude of the location of that point on the vector map of FIG. 6. That is, georeferencing exists if the following are true:

1. If (x, y) represents a location on the digital raster map image (FIG. 2), then f (x, y)=(Lon, Lat) represents the longitude and latitude of the corresponding physical location as depicted on the vector map (FIG. 6).
2. If (Lon, Lat) represents a physical location that lies within the region covered by the vector map of FIG. 6, then g (Lon, Lat)=(x, y) represents the point on the digital raster map image of FIG. 2 that corresponds to that longitude and latitude.

Here, x and y represent the natural internal coordinate system of the raster map image. Typically, as described above, the pixels of a digital raster map, as in FIG. 2, constitute a natural internal coordinate system. A vector map, as in FIG. 6, is based on a longitude and latitude coordinate system as its underlying coordinate system. As such, a vector map may be considered to be trivially georeferenced. Therefore, the functions f and g above are non-trivial georeferencing functions required to convert back and forth between the coordinate systems of the maps of FIG. 2 and FIG. 6.

Figure 7:
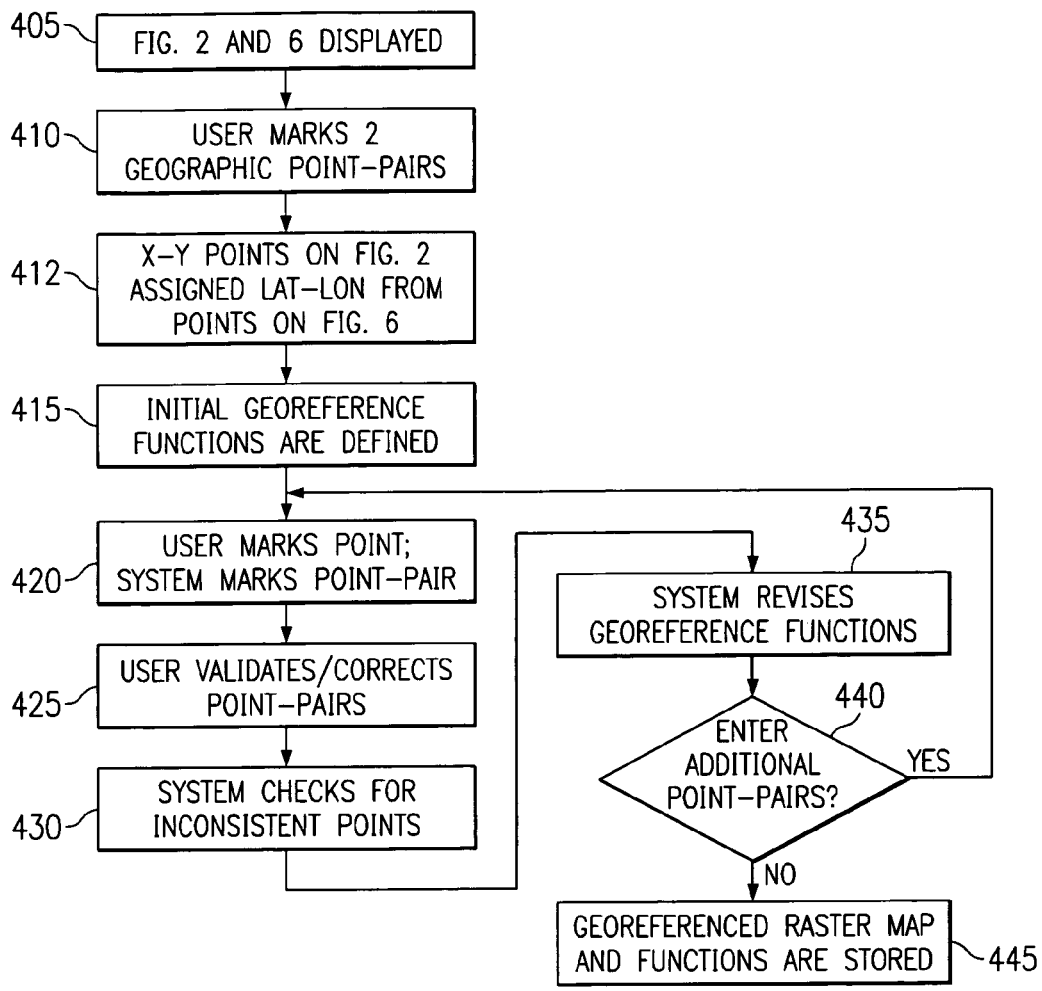
FIG. 7 is a flowchart of the process in accordance with the present invention.
Figure 8:
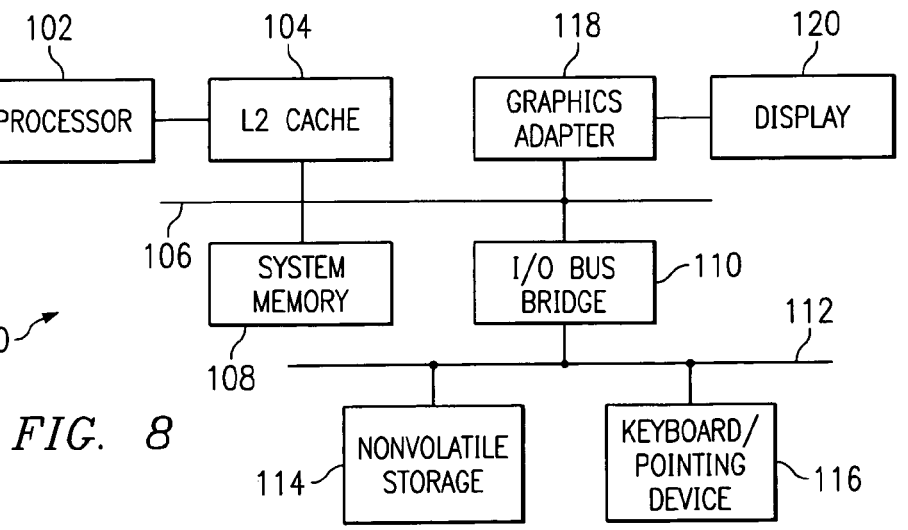
FIG. 8 is a depiction of a computer system for carrying out the method of the present invention.

Referring to FIG. 7, first, the raster map, FIG. 2, to be georeferenced is displayed on a computer monitor at the same time as a previously georeferenced map, FIG. 6. (step 400). Typically, the map of FIG. 6 is a vector map, but could also be another raster map for which georeferencing functions are already known and can be accessed. The maps, FIGS. 2 and 6, are preferably displayed side by side, but may be displayed above and below, in superposition or in any other simultaneous or pseudo-simultaneous (e.g., back-and-forth toggling) display mode.

The maps of FIGS. 2 and 6 are preferebly initially independently manipulable for rotation, position, pan, zoom and scale. The user is free to manipulate the display of both maps until the displayed region of the map in FIG. 2 is generally shown in the display of the map of FIG. 6.

Next, pairs of points, or point-pairs, 200—200, 202—202, etc, representing identical geographic locations on the maps of FIGS. 2 and 6 are identified, and the user uses a keyboard, mouse, or other pointing or capturing device to mark these point-pairs (step 405). For each point-pair, 200—200, etc., one point is marked on FIG. 2 and the other point is marked at the corresponding location on FIG. 6. The point marked on the raster map, FIG. 2, has specific x,y coordinates. The same point marked on the vector map, FIG. 6, has specific latitude,longitude coordinates. Examples of common georeferencing point-pairs include street intersections, 200—200, 202—202, 204—204 and 206—206, sites 208—208 where a road crosses a river, mountain peaks, specific building 0 locations, the intersection of two rivers, and other readily identifiable map features.

If any points on the map of FIG. 2 are identified on the map by longitude and latitude—in the case of FEMA flood maps, this is a rare occurrence—a georeferencing point-pair can be obtained by marking that point on FIG. 2 and marking on FIG. 6 at the location having the identical latitude and longitude. Alternatively, once such latitude,longitude-identified points on FIG. 2 are marked, each will be associated with both lat,lon and x,y coordinates, and each can thereafter be used to determine the georeferencing functions without requiring a corresponding mark on FIG. 6.

After a point-pair is marked on FIGS. 2 and 6, the x,y coordinate on FIG. 2 is assigned the corresponding latitude, longitude of its matching point on FIG. 6 (step 412). When two georeferencing point-pairs are marked, the system computes an initial georeferencing function for FIG. 2 based on a linear transformation that allows an arbitrary rotation and predefined scaling between the x,y domain and the latitude, longitude domain (step 415).

To improve accuracy and allow increased generality, more georeferencing point-pairs will frequently be desired. To facilitate the process of gathering these additional georeferencing point-pairs, the maps of FIGS. 2 and 6 are synchronized. Accordingly, as either map, FIG. 2 or FIG. 6, is zoomed, panned, scrolled, or otherwise caused to display a different region, the other map, FIG. 6 or 2, automatically does the same. This greatly increases the ease with which georeferencing point-pairs can be identified and marked on the maps, because, when the user of the system locates an identifiable feature on one map, the other map will automatically be showing substantially the same location.

After synchronization is achieved, when the user marks a georeferencing point on one of the maps, the system automatically marks the corresponding point on the other map in accordance with the last-calculated georeferencing function (step 420). The user can then make corrections to the location of a point marked by the system in this way (step 425). The user may enter as many point-pairs as are desired; each additional point-pair increases the accuracy of the georeferencing process.

When three or more georeferencing point-pairs are determined, the system computes a georeferencing function for FIG. 2 based on a general linear transformation between the x,y domain and the latitude,longitude domain. When four or more georeferencing point-pairs are determined, the general linear georeferencing function is over-determined. This means that more than the required amount of information to compute the general linear georeferencing functions is available, but that this information may not be completely consistent. The system uses the extra information contained in the additional georeferencing points to provide validation checks to protect against the possibility that some of the data points may be inaccurate (step 430). Point-pairs that deviate excessively with respect to a calculated standard error are presumed to be inaccurate and are omitted from the extant calculation of the georeferencing function. As new point-pairs are added, the system rechecks previously omitted points to determine if those previously omitted points should now be considered when recomputing the georeferencing functions.

The additional point-pairs allow the system to compute the general linear georeferencing functions which best fit the combination of all the available georeferencing point-pairs, so that the active georeferencing functions are revised with each new point-pair (step 435). According to preferred embodiments, this is done by using a "least square" parameter fitting operation.

The user may then proceed to enter the next point-pair (step 440). When the user is finished, the system stores the active georeferencing functions with the raster map of FIG. 2 (step 445). At this time, the raster map is considered fully georeferenced and the related georeferencing functions are stored as is their association with the FIG. 2. When the raster map is later accessed, the system retrieves the relevant georeferencing functions, and applies them to determine the latitude and longitude of any point on the raster map or to determine the x,y cordinates of any point on the vector map of FIG. 6. Thus, at this time, the neatlines of each panel map, the boundary of each panel map inset and the "grid" of neatlines on each index map are, as polygons, fully georeferenced.

While various techniques exist for determining a georeferencing function from sets of point-pairs, the specific approach used by the system and method of the present invention is now discussed.

To carry out the georeferencing process of the present invention, sets of points P, are specified. Let $i \in P$ denote one of the points i of P. Associated value $x_i$, $y_i$ and $Lat_i$, $Lon_i$ refer, respectively, to the x and y coordinates of the point i on the raster map of FIG. 2, and the latitude and longitude of the same point i on the earth's surface, i.e., on the vector map of FIG. 6. There is also defined a set of points $A \subseteq P$, where A is the subset of "active" points, i.e. points which are in extant use in the calculation of the georeferencing functions. A parametric family of functions $\square$ is selected. It is stipulated that functions in this family $\square$ map from (xy) to (Lon,Lat). Any function $f \in \square$ has components $f_1(x,y)=Lon$, and $f_2(x,y)=Lat$. From within this family there is sought the specific function $\hat{f}$ which (in a sense to be defined below) introduces the smallest error in attempting to render the following system of equations true:

$$f(x_i,y_i)=(Lon_i,Lat_i) \text{ for } i \in A \quad (1)$$

Once determined, $\hat{f}$ will function as the georeferencing function which is used to compute corresponding latitude and longitude values (Lon,Lat) on the vector map of FIG. 6 for any point (x,y) on the raster map of FIG. 2. There are a variety of ways to define the function that minimizes error in rendering Equation (1) true. The method of the present invention utilizes a least squares approach, known in mathematics as an $L_2$ approach. This approach seeks to ascertain the function $\hat{f}$ which minimizes the sum of the squared differences between the actual and the predicted values of latitude and longitude. In other words, from among all the functions $f \in \square$, $\hat{f}$ is the one which minimizes:

$$SSE=\Sigma[(f_1(x_i,y_i)-Lon_i)^2+(f_2(x_i,y_i)-Lat_i)^2] \quad (2)$$

Alternatively, the function $\hat{f}$ may be chosen so that the sum of absolute errors, rather than squared errors, is minimized or so that the largest error is minimized. Other criteria are also possible.

In what follows there shall be described methods for computing georeferencing functions based on both a general linear parametric family of functions and a rotational linear family of functions. Those skilled in the art will readily perceive that this approach may be easily generalized to other parametric families of functions. One such other parametric family is a nonlinear parametric family of functions arising from the projection of the earth's surface onto a flat map.

The General Linear Case

In the general linear case, F is the set of all possible linear transformations which map from (x,y) to (Lon,Lat). Thus, $$\hat{f}(x, y) = \begin{bmatrix} \hat{a}_{11} & \hat{a}_{12} \\ \hat{a}_{21} & \hat{a}_{22} \end{bmatrix} \begin{bmatrix} x \\ y \end{bmatrix} + \begin{bmatrix} \hat{b}_1 \\ \hat{b}_2 \end{bmatrix} \quad (3)$$

for some choice of parameters $\hat{a}_{11}$, $\hat{a}_{12}$, $\hat{a}_{21}$, $\hat{a}_{22}$, $\hat{b}_1$, and $\hat{b}_2$. If the region covered by the map to be georeferenced is not too large, then this family of functions will contain a suitable function $\hat{f}$ whose total error, as determined by the least squares methodology, is quite small. In the case where the map to be georeferenced covers an area that is too large, the curvature of the earth must be taken into account and F is not a suitable family of functions. In the latter event, nonlinear functions must be used as mentioned above.

To find $\hat{f}$ we seek the parameters which minimize $$SSE = \sum_{i \in A} (a_{11}x_i + a_{12}y_i + b_1 - Lon_i)^2 + (a_{21}x_i - a_{22}y_i + b_2 - Lat_i)^2 \quad (4)$$

The parameter values which minimize this expression are found by solving the following two independent systems of linear equations:

$$\begin{bmatrix} n & \sum_{i \in A} x_i & \sum_{i \in A} y_i \\ \sum_{i \in A} x_i & \sum_{i \in A} x_i^2 & \sum_{i \in A} x_i y_i \\ \sum_{i \in A} y_i & \sum_{i \in A} x_i y_i & \sum_{i \in A} y_i^2 \end{bmatrix} \begin{bmatrix} b_1 \\ a_{11} \\ a_{12} \end{bmatrix} = \begin{bmatrix} \sum_{i \in A} Lon_i \\ \sum_{i \in A} x_i Lon_i \\ \sum_{i \in A} y_i Lon_i \end{bmatrix} \quad (5a)$$

$$\begin{bmatrix} n & \sum_{i \in A} x_i & \sum_{i \in A} y_i \\ \sum_{i \in A} x_i & \sum_{i \in A} x_i^2 & \sum_{i \in A} x_i y_i \\ \sum_{i \in A} y_i & \sum_{i \in A} x_i y_i & \sum_{i \in A} y_i^2 \end{bmatrix} \begin{bmatrix} b_2 \\ a_{21} \\ a_{22} \end{bmatrix} = \begin{bmatrix} \sum_{i \in A} Lat_i \\ \sum_{i \in A} Lat_i \\ \sum_{i \in A} y_i Lat_i \end{bmatrix} \quad (5b)$$

These systems can be solved by well known methods, such as Gaussian Elimination or LU factorization. The solutions yield the desired values of $\hat{a}_{11}$, $\hat{a}_{12}$, $\hat{a}_{21}$, $\hat{a}_{22}$, $\hat{b}_1$, and $\hat{b}_2$. It should be noted that equations (5a) and (5b) do not have a unique solution unless three or more non-colinear points on the raster map, FIG. 2, are contained in A. Generally speaking, then, it requires the selection of three point-pairs to initiate the calculation of a georeferencing function from the family of general linear transformations. When there are four or more point-pairs, it is possible to compute a standard deviation of errors using the formula:

$$s = \quad (6)$$

-continued $$\sqrt{\frac{\sum_{i \in A}\left[\left(\hat{a}_{11}x_i + \hat{a}_{12}y_i + \hat{b}_1 - Lon_i\right)^2 + \left(\hat{a}_{21}x_i + a_{22}y_i + \hat{b}_2 - Lat_i\right)^2\right]}{n-3}}$$

where s is an estimator for the amount of error to be expected between actual and predicted latitude and longitude values.

The inverse georeferencing function, $\hat{f}^{-1}$ that maps from (Lon, Lat) of one point of a point-pair on the vector map of FIG. 6 to (x,y) of the other point of the point-pair on the raster map, FIG. 2, may now be readily obtained by inverting the function $\hat{f}$. Having done this, it is possible to compute a similar standard deviation of error for $\hat{f}^{-1}$ which is an estimate of error as measured in the x,y coordinates of the raster map of FIG. 2.

The Rotational Linear Case

In the rotational linear case, F is the set of all possible linear transformations which map from (x,y) to (Lon,Lat) and which also allow for a known scale change caused by the difference in distance per degree of latitude and per degree of longitude at any point not on the equator. Thus $$\hat{f}(x,y) = \begin{bmatrix} \frac{\hat{\beta}_3}{\gamma} & -\hat{\beta}_4 \\ -\hat{\beta}_4 & -\hat{\beta}_3 \end{bmatrix}\begin{bmatrix} x \\ y \end{bmatrix} + \begin{bmatrix} \frac{\hat{\beta}_1}{\gamma} \\ \hat{\beta}_2 \end{bmatrix} \quad (7)$$

for some choice of parameters $\hat{\beta}_1$, $\hat{\beta}_2$, $\hat{\beta}_3$, and $\hat{\beta}_4$, where $\gamma=\cos(Lat)$ is computed from the estimated latitude of the map to be georeferenced. Clearly, this is a special case of the more general linear transform described above, where $a_{11}=\beta_3/\gamma, a_{12}=-\beta_4, a_{21}=-\beta_4,$ and $a_{22}=-\beta_3, b_1=\beta_1/\gamma, b_2=\beta_2.$ In theory, if the region covered by the raster map of FIG. 2 to be georeferenced is not too large, then this family of functions will contain a suitable function, $\hat{f}$ whose total error is quite small. In the case where the map to be georeferenced covers a larger area than this, the curvature of the earth must be taken into account and F is not a suitable family of functions. In such a case, nonlinear functions must be used, as noted earlier. In practice, the general linear transform will yield results which are somewhat superior to the rotational linear transform due to the former's innate ability to use arbitrary scaling factors. These arbitrary scaling factors might compensate, for example, for scaling flaws in the digital scanner used to scan in the non-georeferenced paper maps to produce maps like that of FIG. 2. The primary advantage of the rotational linear transform is that it can be computed with only two reference point-pairs, while the general linear transform requires three reference point-pairs.

To find $\hat{f}$ there is sought, as before, the parameters which minimize SSE as defined in equation (4).

The parameter values which minimize this expression are found by solving the following system of linear equations:

$$\begin{bmatrix} n & 0 & \sum x_i & -\sum y_i \\ 0 & n & -\sum y_i & -\sum x_i \\ \sum_{i \in A} x_i & -\sum_{i \in A} y_i & \sum_{i \in A}(x_i^2+y_i^2) & 0 \\ -\sum_{i \in A} y_i & -\sum_{i \in A} x_i & 0 & \sum_{i \in A}(x_i^2+y_i^2) \end{bmatrix} \quad (8)$$

$$\begin{bmatrix} \beta_1 \\ \beta_2 \\ \beta_3 \\ \beta_4 \end{bmatrix} = \begin{bmatrix} \gamma \sum_{i \in A} Lon_i \\ \sum_{i \in A} Lat_i \\ \gamma \sum_{i \in A} x_i\, Lon_i - \sum_{i \in A} y_i\, Lat_i \\ -\gamma \sum_{i \in A} y_i\, Lon_i - \sum_{i \in A} x_i\, Lat_i \end{bmatrix}$$

These systems can easily solved by well known methods, such as Gaussian Elimination, or LU factorization. The solutions yield the desire values of $\hat{\beta}_1$, $\hat{\beta}_1$, $\hat{\beta}_1$, and $\hat{\beta}_1$ which in turn yield the desired values for $\hat{a}_{11}$, $\hat{a}_{12}$, $\hat{a}_{21}$, $\hat{a}_{22}$, $\hat{b}_1$, and $\hat{b}_2$.

It should be noted that equation (8) does not have a unique solution unless two or more points are contained in A. Generally speaking, it requires two points to determine a georeferencing function from the family of rotational linear transformations. When there are three points or more, it is possible to compute a standard deviation of error, s using the formula:

$$s = \sqrt{\frac{\sum_{i \in A}\left[\left(\hat{a}_{11}x_i + \hat{a}_{12}y_i + \hat{b}_1 - Lon_i\right)^2 + \left(\hat{a}_{21}x_i + \hat{a}_{22}y_i + \hat{b}_2 - Lat_i\right)^2\right]}{n-2}}, \quad (9)$$

where s is an estimator for the amount of error to be expected between actual and predicted latitude and longitude values.

The inverse georeferencing function $\hat{f}^{-1}$ that maps from (Lon, Lat) to (x,y) is readily obtained by inverting the function $\hat{f}$. Having done this, it is possible to compute a similar standard deviation of error for $\hat{f}^{-1}$ which is an estimate of error as measured in the bitmap coordinates.

Automatic Error Detection and Handling

When point-pairs are selected, the apparent values of x,y and Lon,Lat which are selected by mouse "clicking" may include error. To reduce the risk of incorrect georeferencing resulting from such errors, certain error handling procedures are built into the georeferencing process of the present invention. One technique utilized by the present invention is to detect a "bad" point-pair and then remove it from the set A of "active" point-pairs, that is, those point-pairs presently involved in the calculation of a georeferencing function. Removing a bad point-pair from A does not delete the information associated with that point-pair. Rather, removing the bad point-pair causes the extant calculation of the georeferencing parameters to be uninfluenced by that point-pair. The point-pair is not removed entirely, because it may be determined at a later stage of the georeferencing, that the point-pair was not really bad, and should be-used in the georeferencing calculation. This will be clarified shortly.

The following steps outline the bad point detection process using the general linear transform approach to georeferencing.

(1) Place all point-pairs so far selected into the active set A. An "active" point-pair comprises a pair of points which are presently being used in the extant georeferencing calculation.

(2) If there are four or less active point-pairs, error correction cannot be performed and the georeferencing function cannot be refined.

(3) If there are five or more active point-pairs, temporarily exclude each of them in turn from the active set A, designating a temporarily excluded point-pair as k. With each point k excluded in turn, the calculate the inverse georeferencing function $\hat{g}^{(k)}$ using the non-k point pairs. Calculate $SSE_k$ for $\hat{g}^{(k)}$.

(4) Calculate the difference between the predicted value and the actual value $\delta_k = |\hat{g}^{(k)}(Lon_k, Lat_k) - (x_k, y_k)|$.

(5) Save the values, $\delta_k$ and $\delta_k/SSE_k$.

(6) Return point k to the active set (and move on to the next value of k.

(7) From among the results found in steps (3)–(6), ascertain if there exists a point k, the absence of which from the calculation of the inverse function, leads to the largest values of $\delta^k/SSE_k < c_1$ and $\delta_k$, where the value of $\delta_k$ also satisfies $\delta^k/SSE_k < c_1$ and $\delta_k < c_2$, where $c_1$ and $c_2$ are constants which are set according to th general level of accuracy to be expected on the particular type of map which is being georeferenced, the current number of active point-pairs, and the dots or pixels per inch of the raster image. If there is such a point, it is designated as erroneous and is removed from the active set A, and return to steps (2) and (3) above. If there is no such point, error detection is completed.

The foregoing error detection may be, of course, carried out on a general purpose computer, preferably the same computer included in the system for manipulating the various maps and for calculating the georeferencing functions.

There are several things to note about the foregoing error detection procedure. One is that allowing the value of $c_1$ and $c_2$ to change with the number of active point-pairs, makes it possible for the georeferencing system and method to utilize point-pairs which might originally have been determined as erroneous or inconsistent after a large enough sample of points has been gathered to make it clear that a lesser level of accuracy is all that can be achieved on this map. Use of the error detection procedure of the present invention cannot reduce the number of active point-pairs to less than four. This scheme means that as each new point is added, all points determined so far are considered, even those which had previously been marked bad. Thus early "misjudgements" on the part of the system can be corrected later, in light of new point information.

The same bad point detection process, can also be implemented when the rotational linear transform is used. In this case the method is capable of reducing the number of active point-pairs to a minimum of three, rather than four for the general linear transform approach outlined above. This can be useful when dealing with small sets of active points.

When the system is georeferencing raster map images that cover a large enough area so that the (nonlinear) curvature of the earth is a source of significant error, the system can calculate nonlinear georeferencing functions whose form corresponds to the map projection that was used to create the map of FIG. 2.

A specific example of the operation and application of the preferred georeferencing method may be shown with reference to the "Flood Zone Determination" business. The Federal Emergency Management Agency (FEMA) publishes a library of tens of thousands of paper maps showing various types of flood zones and their locations in the United States. A flood zone determination on a property is frequently done in the following way:

1. The address of the property is examined, and the location of the property is determined (perhaps through the use of a geocoding system, or by examining an available street map).
2. A map analyst attempts to determine which of the many thousands of FEMA flood maps will contain this property.
3. The map analyst goes to a map storage area and retrieves the desired map, often examining several maps before making a final selection.
4. Having retrieved the paper map, the map analyst next determines where, precisely, the property is located on the map.
5. Finally, the map analyst examines flood zone notations on the map at the property's location in order to determine its flood-zone status.

When performed using paper maps, the above process is difficult and quite time consuming. A database of scanned raster map images, alone, can be used to reduce the time and effort expended on step 3 above. However, georeferenced raster map images can also be used to eliminate virtually all work from steps 2 and 4 above. Since those are generally the most time consuming steps under the current process, the value of georeferenced flood maps is considerable.

Using georeferenced flood map raster images, steps 2 and 4 above, are replaced by:

2'. A computer system combines the pre-designated outlines of the raster map and the georeferencing information to obtain a polygon expressed in terms of latitude and longitude that outlines the region included in each flood map. Then the system determines which of the polygons contain the address in question, which is done using a "point-in-polygon" algorithm. At the conclusion of this process, the computer system has identified a map panel (or perhaps a small number of map panels) that contains the address.

4'. Since the latitude and longitude of the property are known (by virtue of a geocoding phase), the computer system can use the georeferencing of the map panels to locate the property on each of the panels found above, thus largely eliminating any need for the map analyst to scan the flood map for the address location.

Therefore, it is easily seen that by using georeferenced raster maps instead of paper maps, the process of determining flood zones is substantially automated and much more efficient.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, an transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method of georeferencing an initially non-georeferenced raster map image, comprising the steps of:
displaying a raster map and a georeferenced map that both depict substantially the same geographic area;
identifying three non-collinear point-pairs, each point-pair comprising one point on the raster map and one point on the georeferenced map, and each point of a point-pair lying on the same geographic feature on both maps;
using image coordinates of each point on the raster map and geographic coordinates of each corresponding point on the georeferenced map to determine functional relationships between the image coordinates and the geographic coordinates,
wherein the functional relationships between the image coordinates and the geographic coordinates of the point-pairs are calculated by selecting, from a family of parametric equations and according to a general linear transform, an equation that introduces a smallest error between actual and predicted values of longitude and latitude that are assigned to the image coordinates of the raster map; and
thereafter, for each additional corresponding point-pair that is identified, revising the functional relationships between the image coordinates and the geographic coordinates according to the additional point-pairs, and disregarding any point-pairs that are substantially inconsistent with the functional relationships.

2. The method of claim 1, wherein the image coordinates are Cartesian coordinates, and the georeferenced map is a vector map having coordinates representing latitude and longitude.

3. The method of claim 1, wherein displaying the raster map and the georeferenced map occurs substantially simultaneously.

4. The method of claim 1, wherein although the raster map and the georeferenced map diversely depict the geographic area, certain geographic features and their intersections are displayed identically on both maps.

5. The method of claim 4, wherein the identical geographic features include roads, streets, stream beds, railroad tracks, mountain peaks, buildings, and geopolitical boundaries.

6. The method of claim 1, wherein the equation that introduces the smallest error is determined according to a least squares technique.

7. The method of claim 1, further comprising:
storing the functional relationships with the raster map.

8. The method of claim 1, wherein the point-pairs are identified by a user marking the points following a visual determination that the geographic features on which the points lie are the same.

9. The method of claim 1, wherein the raster map includes one or more map insets.

10. The method of claim 1, wherein the georeferenced map includes one or more map insets.

11. The method of claim 9, wherein each map inset may be independently georeferenced.

12. The method of claim 10, wherein each map inset may be independently georeferenced.

13. A computer-implemented method of georeferencing an initially non-georeferenced raster map image, comprising the steps of:
displaying a raster map and a georeferenced map that both depict substantially the same geographic area;
identifying two point-pairs, each point-pair comprising one point on the raster map and one point on the georeferenced map, and each point of a point-pair lying on the same geographic feature on both maps;
using image coordinates of each point on the raster map and geographic coordinates of each corresponding point on the georeferenced map to determine functional relationships between the image coordinates and the geographic coordinates,
wherein the functional relationships between the image coordinates and the geographic coordinates of the point-pairs are calculated by selecting, from a family of parametric equations and according to a rotational linear transform, an equation that introduces a smallest error between actual and predicted values of longitude and latitude that are assigned to the image coordinates of the raster map; and
thereafter, for each additional corresponding point-pair that is identified, revising the functional relationships between the image coordinates and the geographic coordinates according to the additional point-pairs, and disregarding any point-pairs that are substantially inconsistent with the functional relationships.

14. The method of claim 13, wherein the raster map includes one or more map insets.

15. The method of claim 14, wherein each map inset may be independently georeferenced.

16. The method of claim 13, wherein the georeferenced map includes one or more map insets.

17. The method of claim 16, wherein each map inset may be independently georeferenced.

18. A computer-implemented method of georeferencing an initially non-georeferenced raster map image, comprising the steps of:
displaying a raster map and a georeferenced map that both depict substantially the same geographic area;
identifying at least two non-collinear point-pairs, each point-pair comprising one point on the raster map and one point on the georeferenced map, and each point of a point-pair lying on the same geographic feature on both maps;
using image coordinates of each point on the raster map and geographic coordinates of each corresponding point on the georeferenced map to determine functional relationships between the image coordinates and the geographic coordinates,
wherein the functional relationships between the image coordinates and the geographic coordinates of the point-pairs are calculated by selecting, from a family of parametric equations and according to a rotational linear transform, an equation that introduces a smallest error between actual and predicted values of longitude and latitude that are assigned to the image coordinates of the raster map; and
thereafter, for each additional corresponding point-pair that is identified, revising the functional relationships between the image coordinates and the geographic coordinates according to the additional point-pairs, and disregarding any point-pairs that are substantially inconsistent with the functional relationships.

19. The method of claim 18, wherein the raster map includes one or more map insets.

20. The method of claim 19, wherein each map inset may be independently georeferenced.

21. The method of claim 18, wherein the georeferenced map includes one or more map insets.

22. The method of claim 21, wherein each map inset may be independently georeferenced.

23. A computer system for georeferencing an initially non-georeferenced raster map image, comprising:
 a monitor for displaying a raster map and a georeferenced map that both depict substantially the same geographic area;
 a first facility for identifying three non-collinear point-pairs, each point-pair comprising one point on the raster map and one point on the georeferenced map, and each point of a point-pair lying on the same geographic feature on both maps;
 a second facility that use raster image coordinates of each point on the raster map and the geographic coordinates of each corresponding point on the georeferenced map to determine functional relationships between the raster image coordinates and the geographic coordinates,
 wherein the second facility calculates the functional relationships between the raster image coordinates and the geographic coordinates of the point-pairs by selecting, from a family of parametric equations and according to a general linear transform, an equation that introduces a smallest error between actual and predicted values of longitude and latitude that are assigned to the raster image coordinates of the raster map; and
 a third facility for, after each additional corresponding point-pair is identified, revising the functional relationships between the raster image coordinates and the geographic coordinates according to the additional point-pairs, and disregarding any point-pairs that are substantially inconsistent with the functional relationships.

24. The system of claim 23, wherein the image coordinates are Cartesian coordinates, and the georeferenced map is a vector map having coordinates representing latitude and longitude.

25. The system of claim 23, wherein the raster map and the georeferenced map are displayed substantially simultaneously by the monitor.

26. The system of claim 23, wherein although the raster map and the georeferenced man diversely depict the geographic area, certain geographic features and their intersections are displayed identically on both maps.

27. The system of claim 26, wherein the identical geographic features include roads, streets, stream beds, railroad tracks, mountain peaks, buildings, and geopolitical boundaries.

28. The system of claim 23, wherein the equation that introduces the smallest error is determined according to a least squares technique.

29. The system of claim 23, further comprising:
 a fourth facility for storing the functional relationships together with the raster map.

30. The system of claim 23, wherein the first facility include a device by which a user can mark the points of a point-pair following visually determining, from the monitor, that the geographic features on which the points lie are the same.

31. The system of claim 23, wherein the raster map includes one or more map insets.

32. The system of claim 31, wherein each map inset may be independently georeferenced.

33. The system of claim 23, wherein the georeferenced map includes one or more map insets.

34. The system of claim 33, wherein each map inset may be independently georeferenced.

35. A computer system for georeferencing an initially non-georeferenced raster map image, comprising:
 a monitor for displaying a raster map and a georeferenced map that both depict substantially the same geographic area;
 a first facility for identifying two point-pairs, each point-pair comprising one point on the raster map and one point on the georeferenced map, and each point of a point-pair lying on the same geographic feature on both maps;
 a second facility that use raster image coordinates of each point on the raster map and the geographic coordinates of each corresponding point on the georeferenced map to determine functional relationships between the raster image coordinates and the geographic coordinates,
 wherein the second facility calculates the functional relationships between the raster image coordinates and the geographic coordinates of the point-pairs by selecting, from a family of parametric equations and according to a rotational linear transform, an equation that introduces a smallest error between actual and predicted values of longitude and latitude that are assigned to the raster image coordinates of the raster map; and
 a third facility for, after each additional corresponding point-pair is identified, revising the functional relationships between the raster image coordinates and the geographic coordinates according to the additional point-pairs, and disregarding any point-pairs that are substantially inconsistent with the functional relationships.

36. The system of claim 35, wherein the raster map includes one or more map insets.

37. The system of claim 36, wherein each map inset may be independently georeferenced.

38. The system of claim 35, wherein the georeferenced map includes one or more map insets.

39. The system of claim 38, wherein each map inset may be independently georeferenced.

40. A computer system for georeferencing an initially non-georeferenced raster map image, comprising:
 a monitor for displaying a raster map and a georeferenced map that both depict substantially the same geographic area;
 a first facility for identifying two non-collinear point-pairs, each point-pair comprising one point on the raster map and one point on the georeferenced map, and each point of a point-pair lying on the same geographic feature on both maps;
 a second facility that use raster image coordinates of each point on the raster map and the geographic coordinates of each corresponding point on the georeferenced map to determine functional relationships between the raster image coordinates and the geographic coordinates,
 wherein the second facility calculates the functional relationships between the raster image coordinates and the geographic coordinates of the point-pairs by selecting, from a family of parametric equations and according to a rotational linear transform, an equation that introduces a smallest error between actual and predicted values of longitude and latitude that are assigned to the raster image coordinates of the raster map; and
 a third facility for, after each additional corresponding point-pair is identified, revising the functional relationships between the raster image coordinates and the geographic coordinates according to the additional point-pairs, and disregarding any point-pairs that are substantially inconsistent with the functional relationships.

41. The system of claim 40, wherein the raster map includes one or more map insets.

42. The system of claim 41, wherein each map inset may be independently georeferenced.

43. The system of claim 40, wherein the georeferenced map includes one or more map insets.

44. The system of claim 43, wherein each map inset may be independently georeferenced.

* * * * *